(12) United States Patent
Muramatsu

(10) Patent No.: US 8,496,528 B2
(45) Date of Patent: Jul. 30, 2013

(54) DIRECTIONAL PAD KEYSTROKE ADJUSTMENT MECHANISM

(76) Inventor: Hiroaki Muramatsu, Yokohama (JP)

( * ) Notice: Subject to any disclaimer, the term of this patent is extended or adjusted under 35 U.S.C. 154(b) by 2 days.

(21) Appl. No.: 13/224,705

(22) Filed: Sep. 2, 2011

(65) Prior Publication Data

US 2012/0142418 A1    Jun. 7, 2012

(30) Foreign Application Priority Data

Sep. 3, 2010    (JP) .................................. 2010-198221

(51) Int. Cl.
    *A63F 9/24*    (2006.01)
(52) U.S. Cl.
    USPC .......................................................... 463/37
(58) Field of Classification Search
    USPC .......................................................... 463/37
    See application file for complete search history.

(56) References Cited

U.S. PATENT DOCUMENTS 5,359,163 A * 10/1994 Woodard ...................... 200/249
2005/0006215 A1 * 1/2005 Sasaki et al. .................. 200/344
2005/0124416 A1 * 6/2005 Hammond et al. ............. 463/37
2005/0255915 A1 * 11/2005 Riggs et al. ..................... 463/37
2010/0173689 A1 * 7/2010 Ansari et al. .................... 463/16
2012/0050232 A1 * 3/2012 Ikeda et al. .................... 345/184

* cited by examiner

*Primary Examiner* — Arthur O. Hall
*Assistant Examiner* — Steve Rowland
(74) *Attorney, Agent, or Firm* — Michael N. Cohen; Cohen I.P. Law Group P.C.

(57) ABSTRACT

A controller characterized with a function for adjusting the controller to provide an optimal operational feel to a player comprises a main body configured to be held by the player performing a game, a plurality of operational keys arranged on the main body, a pair of analog stick means arranged on the main body, a switch arranged in contact with the plurality of operational keys and a plurality of adjustment parts for adjusting key stroke of the plurality of operational keys. The plurality of operational keys is configured to be operated by a finger of the player. The plurality of plurality of operational keys, the switch and the plurality of adjustment parts are configured to be adjusted by the player holding the controller so as to achieve an optimal operational feel, according to the player's preferences and game characteristics.

7 Claims, 9 Drawing Sheets

DIRECTIONAL PAD KEYSTROKE ADJUSTMENT MECHANISM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to hand-held game controllers, and more particularly to an improved controller for providing an optimum operational feel to the player.

DISCUSSION OF RELATED ART

Conventionally, when playing games using a game console, it is common to hold a controller which is connected to the game console and play the game by operating keys provided on the controller. Standard game console controllers are generally designed by a maker, and have a fixed shape. The users who hold these uniformly designed controllers have entirely different body types and habits. For example, in terms of body type, there will be differences in the size of the hands, and the length and thickness of the fingers, while in terms of habits, there will be differences in the way in which the controller is held, as well as in the particular fingers and the specific parts of the fingers with which the keys and buttons are pressed.

U.S. Pat. No. 7,976,385 issued to Riggs on May 11, 2005 discloses a game controller with sensitivity adjustment. The game controller includes at least one control device adapted for substantially uninterrupted control of an aspect of the video game, the at least one control device having at least a first sensitivity level and a second sensitivity level, and an adjustment device adapted to change the first sensitivity level to the second sensitivity level of the at least one control device without interrupting the substantially uninterrupted control. However, the game controller is in the form of a steering wheel and hence do not provide an operational feel to the player.

U.S. Pat. No. 6,722,984 issued to Sweeney on Apr. 20, 2004 discloses a game controller with parental control functionality. The controller comprises a hand-held casing having a plurality of console command buttons to cause the transmission of commands to the video game console. Parental control is provided by preventing the transmission of commands to the video game console in response to activation of a console command button. However, the controller cannot be programmed to adjust the sensitivity of the keys.

U.S. Pat. No. 6,102,802 issued to Armstrong on Aug. 15, 2000 discloses a game controller with analog pressure sensors. The game controller can be held in two hands simultaneously for controlling electronic games. The game controller includes a housing, a plurality of depressible individual buttons to operate electricity manipulating devices contained within said housing means, a means for creating an analog electrical output proportional to varying physical pressure applied by at least one depressible individual button of the plurality of depressible individual buttons and a means for outputting a signal to an image generation machine. At least one of the electricity manipulating devices is a pressure-sensitive variable-conductance sensor for creating an analog electrical output proportional to varying physical pressure applied to at least one depressible surface. However, the game controller does not provide any key stroke to adjustment to the player.

Therefore, there is a need for a device that can provide an operational feel to the player. Such a needed device would be able to provide key stroke adjustment to the player. The device would be able to provide an adjustment part to adjust the key stroke of the device. Further, the device would not require any additional means for adjusting the key stroke according to the player's need and game characteristics. Moreover, such a controller would be simple and easy to use. The present invention accomplishes these objectives.

SUMMARY OF THE INVENTION

The present invention is a controller characterized with a function for adjusting the controller to provide an optimal operational feel to the player. More specifically, the controller is as follows. The controller comprises a main body configured to be held by a player performing a game, a plurality of operational keys arranged on the main body, a pair of analog stick means arranged on the main body, a switch arranged in contact with the plurality of operational keys and a plurality of adjustment parts for adjusting key stroke of the plurality of operational keys. The plurality of operational keys, the switch and the plurality of adjustment parts are configured to adjust the controller to provide an optimal operational feel to the player.

The plurality of operational keys is configured to allow for press-down actuation by the player. The plurality of operational keys comprises a cross key means, a push button means and a pair of trigger button means. The cross key means is configured to generate operation information in the up, down, left and right cross key directions. The push button means consists of a plurality of buttons to generate operational information. The pair of trigger button means consists of a left trigger button means and a right trigger button means to generate operational information. The plurality of operational keys is configured to be operated by a finger of the player.

The analog stick means is an interface used for operational input. The analog stick means is a stick that is controlled by way of the direction in which the stick is inclined, so as to perform input in any direction through 360°, around a neutral position. The analog stick means is configured such that it is operated only by way of the inclination and is primarily used for direction specifying operations. The switch is actuated by means of press-down actuation by the player. The switch is actuated as a result of press-down actuation, by way of direct contact or indirect contact with the operational key. The switch operation is such that, when the plurality of operational keys is pressed down so that greater than a certain amount of pressure is applied to the switch, the insulating rubber yields and the conductive rubber allows conduction between fixed contacts formed on an electrical circuit on a substrate.

The present invention provides a user friendly controller. Such a needed device would provide key stroke adjustment to the player. Further, the device does not require any additional means for adjusting the key stroke of the controller according to the player's need. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
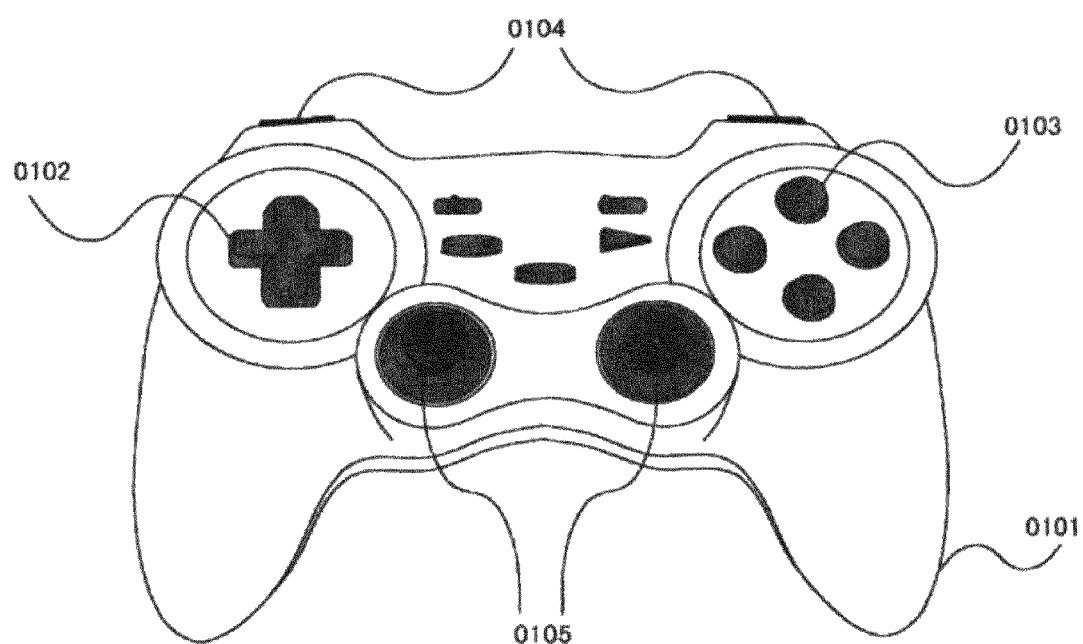
FIG. 1 is a perspective view of the present invention, illustrating a controller in accordance with a first mode of embodiment.
Figure 2A:
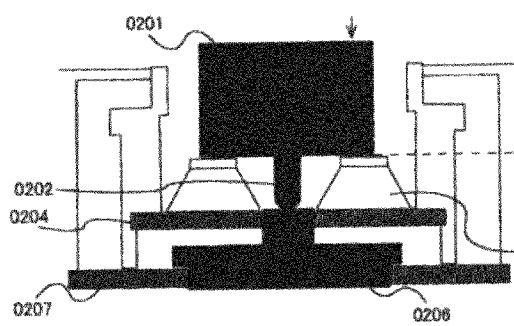
FIGS. 2(a)-2(d) are schematic views of the present invention, illustrating key stroke adjustment operation of a cross key means of the controller in accordance with the first mode of embodiment.
Figure 2B:
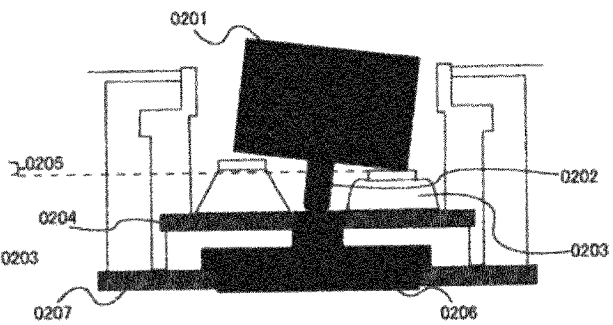
Figure 2C:
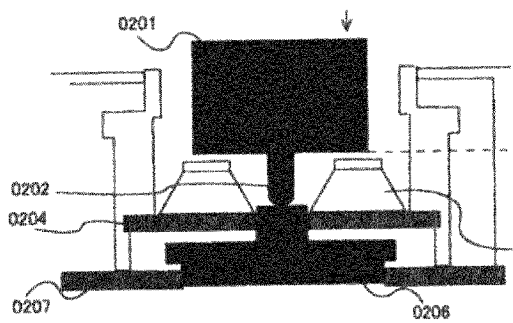
Figure 2D:
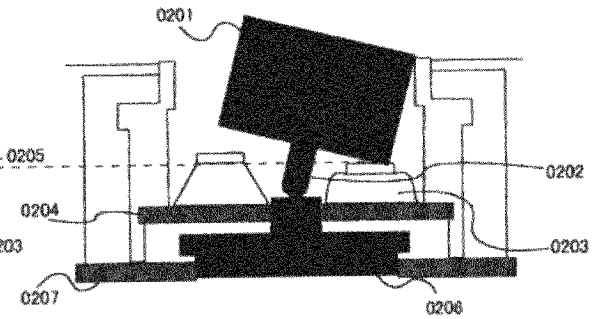

FIG. 1 is a perspective view of the present invention, illustrating a controller in accordance with a first mode of embodiment. The controller comprises a main body 101 configured to be held by a player performing a game, a plurality of operational keys (0102, 0103, 0104) arranged on the main body 101, a pair of analog stick means 0105 arranged on the main body 0101, a switch (not shown) arranged in contact with the plurality of operational keys (0102, 0103, 0104) and a plurality of adjustment parts (not shown) for adjusting key stroke of the plurality of operational keys (0102, 0103, 0104). The plurality of operational keys (0102, 0103, 0104), the switch and the plurality of adjustment parts are configured to adjust the controller to provide an optimal operational feel to the player.

The plurality of operational keys is configured to allow for press-down actuation by the player. The plurality of operational keys comprises a cross key means 0102, a push button means 0103 and a pair of trigger button means 0104. The cross key means 0102 is configured to generate operation information in the up, down, left and right cross key directions. The push button means 0103 consists of a plurality of buttons to generate operational information. Specifically, the plurality of buttons is provided in a group. The push button means 0103 is often arranged on the top face of the main body, which is to say the face on which the cross key means 0102 is arranged, but the push button means 0103 may also be arranged on a side face or the back face. For purposes of identification, symbols may be provided on each of the buttons (for example, "A, B, X, Y" or "○, □, □, x"). The push button means 0103 are generally used for specifying actions like choosing an option, canceling, kicking and punching in a game. The plurality of operational keys (0102, 0103, 0104) is configured to be operated by a finger of the player.

The pair of trigger button means 0104 consists of a left trigger button means and a right trigger button means to generate operational information. The left trigger button means and the right trigger button means are operated in a trigger pulling direction. The pair of trigger button means 0104 is often arranged on the back of the main body 0101. When operated by the finger of the player carrying out the game, the trigger button means 0104 are often operated by the index fingers or the middle fingers, which are wrapped around the back of the main body 0101. When a press-down actuation is performed, the trigger button means 0104 is operated in the direction of pulling a trigger, and thus these are referred to as trigger buttons. The right trigger button means may be referred to as the R trigger, while the left trigger button means may be referred to as the L trigger.

The analog stick means 0105 is an interface used for operational input. The analog stick means 0105 is a stick that is controlled by way of the direction in which the stick is inclined, so as to perform input in any direction through 360°, around a neutral position, which is the no-operation position. Specifically, the analog stick means 0105 allows for multi-value processing of input from the stick. As with the cross key means 0102 described above, the analog stick means 0105 is primarily used for direction specifying operations. The analog stick means 0105 is configured such that it is operated only by way of the inclination.

The switch is actuated by means of press-down actuation by the player. The switch is actuated so as to switch ON and OFF the current in an electrical circuit on a substrate. The switch is actuated as a result of press-down actuation, by way of direct contact or indirect contact with the operational key. The switch operation is such that, when the plurality of operational keys (0102, 0103, 0104) is pressed down so that greater than a certain amount of pressure is applied to the switch, the insulating rubber yields and the conductive rubber allows conduction between fixed contacts formed on an electrical circuit on a substrate. The switch may be a dome shaped rubber contact switch made of a material selected from a group consisting of: insulating rubber or conductive rubber. The conductive rubber generally used is a material wherein carbon black has been added to silicone.

There are no particular restrictions on the materials for the aforementioned operational keys and analog stick means, while synthetic resins can be used, the configuration may also be such as to allow removal of top materials, which come into contact with the player's fingers, and to allow replacement with materials having different properties or hardness. For example, replacement members comprising materials such as cork or EVA may be used. As a result, it is possible to achieve an operational feel that is more closely suited to the preferences of the player.

FIGS. 2(a) through 2(d) illustrate schematic views of the present invention, illustrating key stroke adjustment operation of the cross key means 0201 of the controller in accordance with the first mode of embodiment. The plurality of adjustment parts (0206, 0207) is configured for adjusting key stroke of the plurality of operational keys (0101, 0102, 0103). The key stroke is the distance moved before a switch actuation position is reached as a result of a press-down actuation of the operational keys (0101, 0102, 0103). In these figures, the key stroke corresponds to the 0205 portion and the adjustment part comprises a vertical lift mount 0206 and a seat 0207. The vertical lift mount 0206 is a mount that supports the operational key by making direct or indirect contact with the operational key, and is vertically raised and lowered relative to the seat. When the vertical lift mount 0206 is vertically raised or lowered, the cross key means 0201 that is supported by the vertical lift mount 0206 is also vertically raised or lowered. Specifically, for example, the vertical lift mount 0206 may be of a threaded type, and may be engaged with the seat, so that the vertical lift mount 0206 can be vertically raised or lowered relative to the seat by rotating the vertical lift mount in a screwing direction. The seat 0207 is fixed in place on the main body 0101 or is formed integrally with the main body 0101.

FIGS. 2 (a) and 2(c) show situations in which the cross key means has not been pressed down. FIGS. 2 (b) and 2(d) show situations in which the cross key means has been pressed down. In FIGS. 2 (a) and 2(b), the vertical lift mount has been lowered and in FIGS. 2 (c) and 2(d), the vertical lift mount has been raised. The switch 0203 is actuated only when greater than certain amount of pressure is applied to the switch, which switches the current in an electrical circuit on a substrate 0204 ON or OFF. In FIGS. 2(b) and 2 (d), when the cross key means 0201 is pressed down in the direction of the arrow, the cross key means 0201 tilts, with the end of a support shaft 0202 as a pivot, so as to contact the switch 0203. If the vertical lift mount 0206 is raised with respect to the seat 0207 that is fixed in place on the main body, the cross key means 0201 that is supported on the vertical lift mount is also relatively raised, thus allowing the key stroke 0205 to be adjusted.

Figure 3:
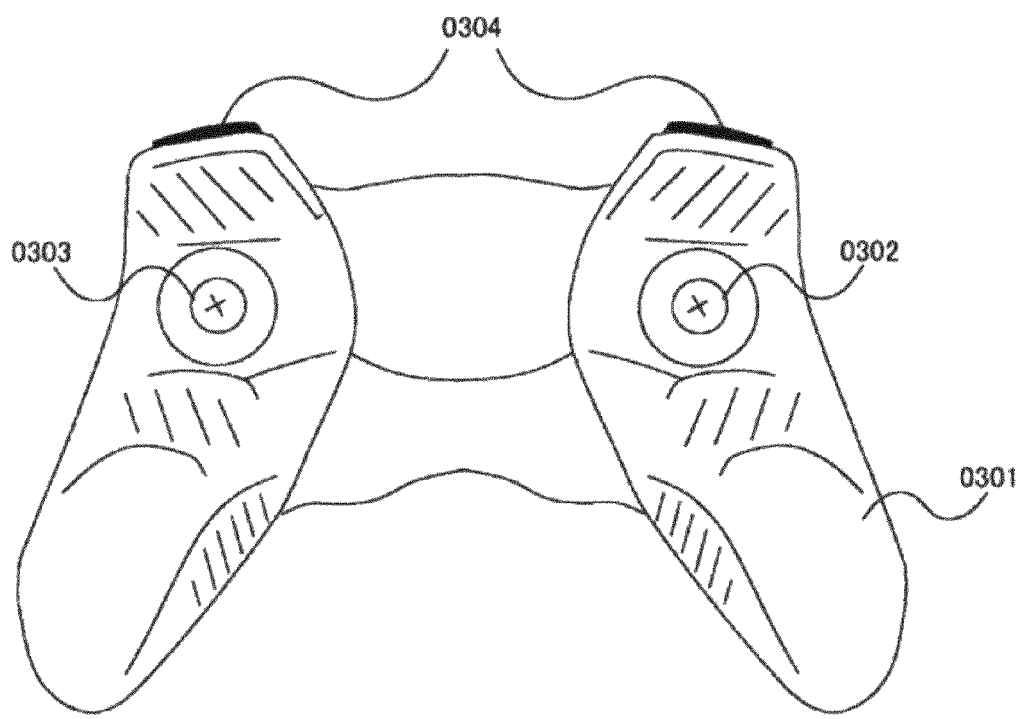
FIG. 3 is a perspective view of the present invention, illustrating a vertical lift mount located at a bottom of the main body in accordance with the first mode of embodiment.

FIG. 3 is a perspective view of the present invention, illustrating the vertical lift mount 0303 located at a bottom of the main body 0301 and a part of trigger means 304 in accordance with the first mode of embodiment. The vertical lift mount 0302 is partially exposed at the bottom of the main body 0301, and can be operated by the player, by turning the seat. A vertical lift mount 0303 is provided, which is the adjustment part for adjusting the key stroke of the push button means 0103 in the same manner as that of the key stroke adjustment for the cross key means 0203. The pair of trigger button means 0304 consists of a left trigger button means and a right trigger button means to generate operational information. The spacer 0302 is partially exposed at the bottom of the main body 0301. If a portion of the spacer is exposed at the exterior, as shown in this figure, the player can adjust the relative positional relationship between the spacer and the base by rotating that portion.

Figure 4A:
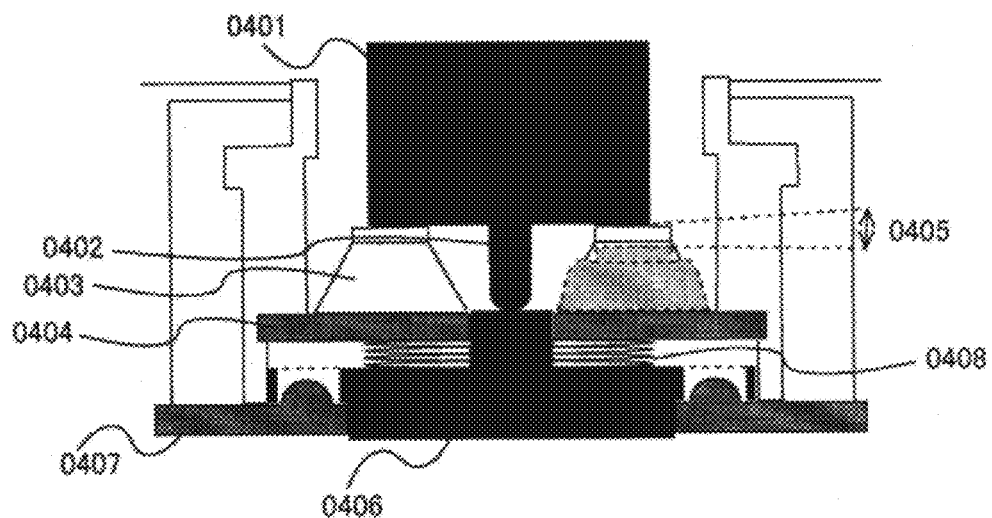
FIGS. 4(a)-4(c) illustrate schematic views of the key stroke adjustment of the controller in accordance with a second mode of embodiment of the present invention.
Figure 4B:
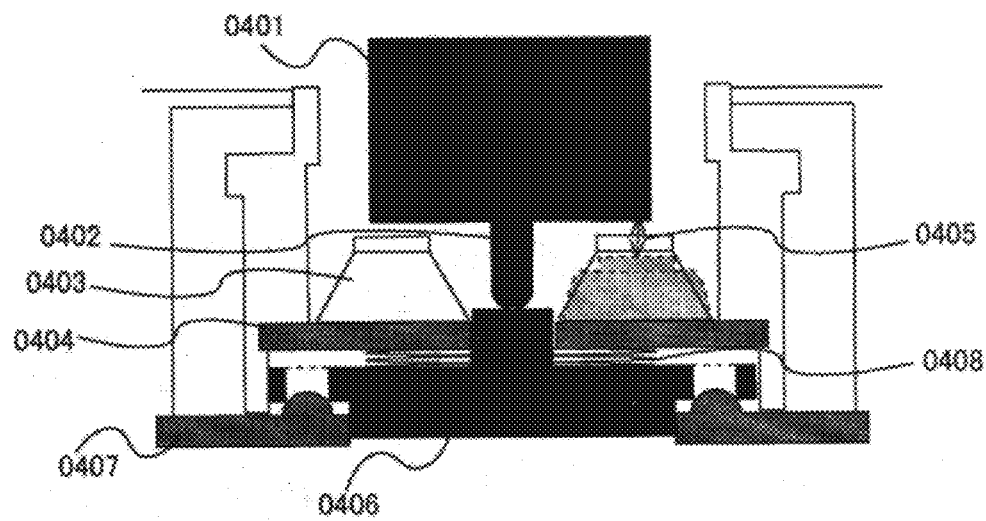
Figure 4C:
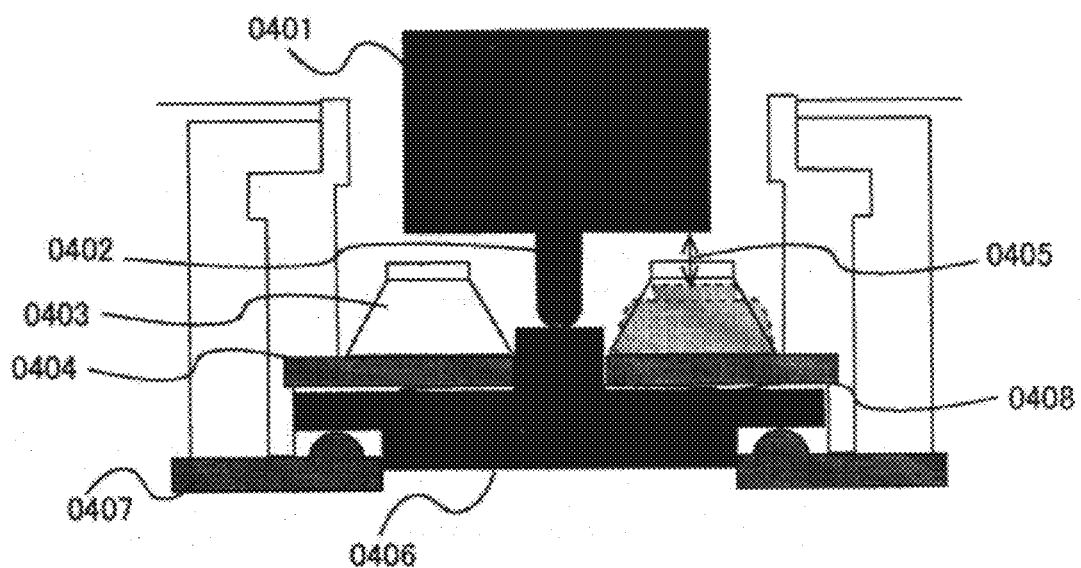
Figures 5A, 5C, 5E:
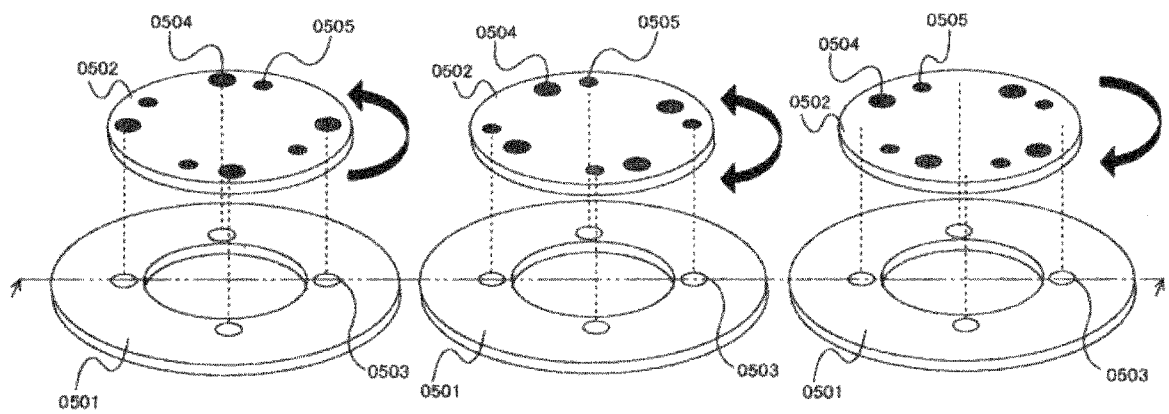
FIGS. 5(a)-5(f) illustrate perspective views of a base and a spacer in accordance with the second mode of embodiment of the present invention.
Figures 5B, 5D, 5F:
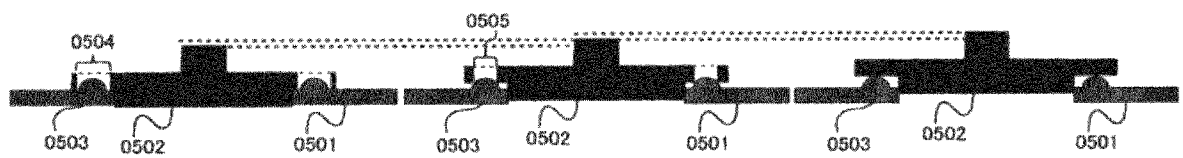
Figure 6A:
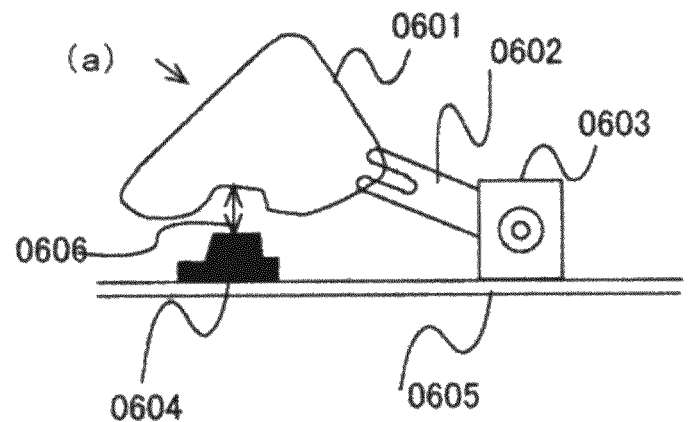
FIGS. 6(a)-6(d) illustrate operation of the trigger button means in accordance with the first mode of embodiment of the present invention.
Figure 6B:
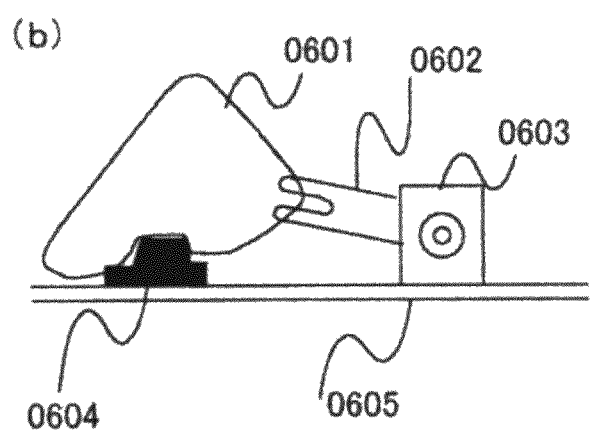
Figure 6C:
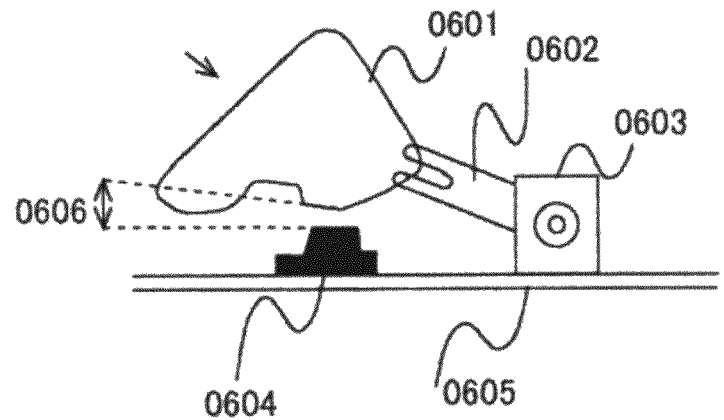
Figure 6D:
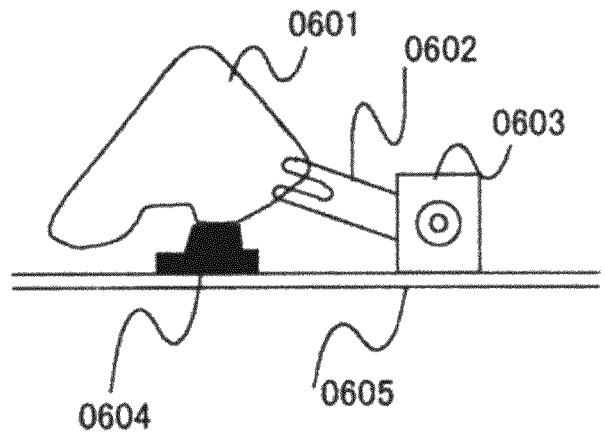

FIGS. 4(a)-4(c) illustrate schematic views of the key stroke adjustment of the controller in accordance with a second mode of embodiment of the present invention. In FIGS. 4(a), 4(b) and 4(c), the key stroke 0405 is progressively elongated. In this figure, the dotted line indicates the position at which the switch 0403 is actuated. A spring 0408 is provided between the substrate 0404 and the base 0407. The cross key means 0401 is directly supported by way of the spacer 0406 making contact with the tip of the support shaft 0402 of the cross key means 0401. As shown in FIG. 4(b), if the spacer 0406 is elevated relative to the sliding surface of the base 0407 that is fixed in place on the main body, as compared to FIG. 4 (a) and in the manner of FIG. 4 (c) as compared to FIG. 4 (b), the cross key means 0401 that is supported on the spacer will also be relatively elevated, whereby the key stroke 0405 can be adjusted.

The key stroke 0405 can influence the operational feel for the player. If the key stroke 0405 is shallow, the switch 403 will be actuated as a result of a minimal operation by the player, allowing for rapid operation. Shallow keystrokes are, therefore, suited for games such as fighting games, which require rapid operation. Meanwhile, if the key stroke 0405 is shallow, because the game will respond to a minimal movement of the player's finger, there is a risk of operational mistakes. Furthermore, if the key stroke 0405 is shallow, some individuals will tend not to feel that they have pressed the button down, and this may not suit the preferences of the player.

FIGS. 5(a) through 5(f) illustrate perspective views of a base 0501 and a spacer 0502 in accordance with the second mode of embodiment of the present invention. FIGS. 5 (a), 5(c) and 5(e) are perspective views of the base 0501 and a spacer 0502, while FIGS. 5 (b), 5(d) and 5(f) are sectional views showing situations in which the bases and spacers that are shown in the perspective views have been overlaid. The base 0501 may be configured as a planar member that is fixed in place on the main body 0101 or formed as an integral part of the main body 0101. The base 0501 has a sliding surface. The sliding surface faces the spacer 0502 and serves as a surface on which the spacer slides. The base includes at least one protrusion 0503 on the sliding surface. The at least one protrusion 0503 may be received by at least one recess (0504, 0505) positioned on a facing surface of the spacer positioned opposite to the sliding surface. The spacer 0502 may be configured as a mount that supports the operational key, by making direct or indirect contact with the operational key. The key stroke is adjusted by sliding the spacer 0502 with the spacer 0502 biased towards the sliding surface.

There are no particular restrictions on the shape of the at least one protrusion 0503 but, for example, they may be dome shaped. Furthermore, while all of the protrusions may be of the same size, it is also possible that these may be of different sizes. There are no particular restrictions on the shapes of the recesses (0504, 0505), but these may also be dome shaped. The recess shape can also include cylindrical through holes, as shown in this figure. These recesses can receive the entirety of any one or more of the aforementioned protrusions, and/or only an upper portion of any one or more of the aforementioned protrusions. Hereafter, examples of combinations of recesses and protrusions are described with which, by changing the combination, the height of the spacer with respect to the sliding surface will change in accordance to whether or not the protrusions are received in the recesses and/or the extent to which the protrusions are received in the recesses, whereby the key stroke is adjusted.

For example, when the protrusions on the base are entirely received in the large recesses 0504 in the spacer, as shown in FIGS. 5 (a) and 5(b), the opposing faces of the base 0501 and the spacer 0502 are in close contact. If the spacer 0502 in FIGS. 5 (a) and 5(b) are rotated in the direction of the arrow, the spacer 0502 will move to a position at which the small recess 0505 of the spacer is paired with a portion of the base 0501 as shown in FIGS. 5 (c) and 5(d).

Only the upper portion of the at least one protrusion 0503 is accommodated by the small recess 0505 in the spacer 0502. As shown in the figure, the at least one protrusion 0503 supports the small recess in the spacer 0502, and therefore the position of the spacer 0502 relative to the sliding surface of the base 0501 is higher than in the case where the entirety of the at least one protrusion 0503 is received in the large recess 0504 in the spacer as described above. It is not necessary for the base protrusions to be of the same size in the manner described above, and (large) base protrusions and (small) base protrusions may be arranged to match the positions and sizes of the (large) recesses in the spacer and the (small) recesses in the spacer. In this case, the spacer 0502 can be supported by the (small) base protrusions, which reduces the risk of damage due to applying excessive force to the (small) recesses.

In FIGS. 5 (c) and 5(d), if the spacer 0502 is rotated in the direction of the arrow, the spacer 0502 will move to a position at which the at least one protrusion 0503 is paired with a portion of the spacer 0502 at which there are no recesses, as shown in FIGS. 5 (*e*) and (*f*). In this case, because the at least one protrusion 0503 is not received in the spacer recesses (0504,0505), the position of the spacer 0502 with respect to the sliding surface of the base 0501 is elevated by an amount corresponding to the height of the protrusions. It is possible to vary the height of the spacer 0502 with respect to the sliding surface of the base 0501 in more stages, so that it is possible to adjust the key stroke in a manner that more finely corresponds to player preferences.

With the controller of this mode of embodiment, the player holding the controller can make adjustments so as to achieve an optimal operational feel, according to the player's preferences and game characteristics. Moreover, if the key stroke is adjusted by way of combining protrusions and recesses as in the present mode of embodiment, the player can easily grasp their preferred combination, and easily make the adjustment. Furthermore, because the spacer 0502 is not fixed in place on the main body, but rather is replaceable, not only is repair easy in the event that the spacer 0502 is damaged, the spacer 0502 may be replaced with a spacer having different recess shapes allows for key stroke adjustment with more stages.

FIGS. 6(*a*)-6(*d*) illustrate operation of the trigger button means in accordance with the first mode of embodiment of the present invention. FIGS. 6 (*a*) and 6(*c*) show situations in which the trigger button means 0601 has not been pressed down, while FIGS. 6 (*b*) and (*d*) show situations in which the trigger button means 0601 has been pressed down. The trigger button means 0601 is fixed on a pivot 0603 by way of a support shaft 0602, both ends of which are rotatably mounted. When the operational key is pressed down in the direction of the arrow, the support shaft 0602 rotates so that the operational key contacts a switch 0604. Thus, as a result of the contact between the operational key and the switch 0604, greater than a certain amount of pressure is applied to the switch, which in turn is actuated and switches the current in an electrical circuit on a substrate 0605 ON or OFF. A space adjustment means, which is the adjustment part, is combined with the switch 0604. If the position of space adjustment means on the substrate 0605 is moved from the position shown in FIG. 6 (*a*) to the position shown in FIG. 6 (*c*), the key stroke (0606) will be shortened. The switch may be provided separately from the space adjustment means.

Furthermore, the controller in the present mode of embodiment may have a function in which the default values for turning the current ON or OFF in the electric circuit are adjusted in keeping with a change in the position of the space adjustment means on the substrate 0605. In other words, a plurality of sets of fixed contacts may be provided on the substrate, which will serve to conduct electricity before and after movement of the space adjustment means on the substrate. In this manner, the player can conveniently use the controller simply by moving the position of a grip serving to move the space adjustment means, without having to separately adjust the default values for turning the current ON or OFF in the electric circuit.

Figure 7A:
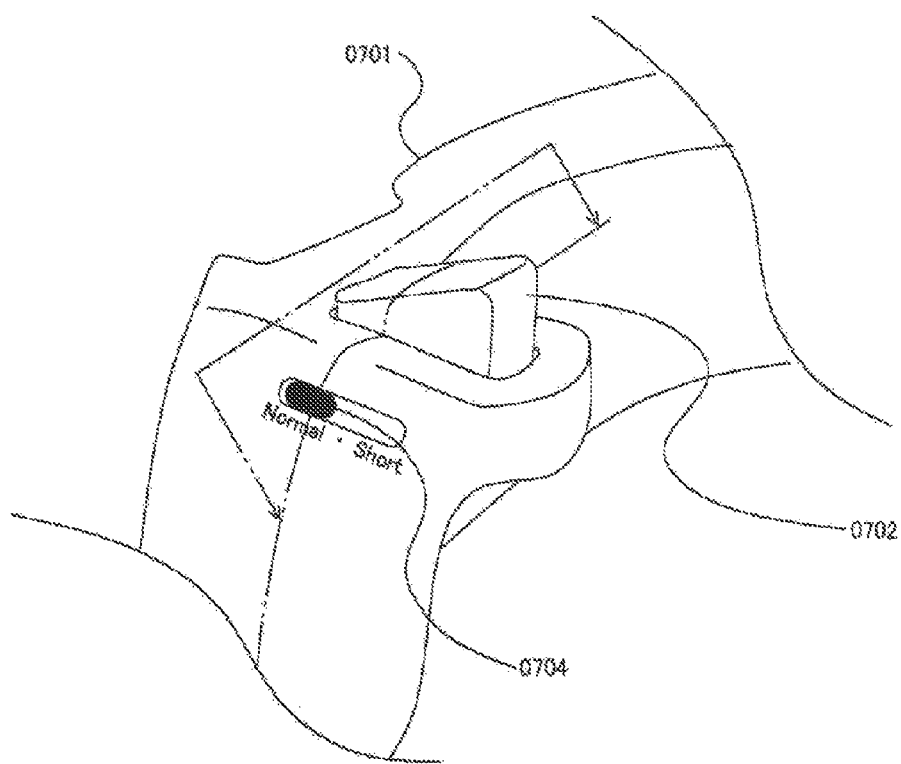
FIGS. 7(a)-7(b) are perspective views of the present invention, illustrating an example of the surroundings and a sectional view of a trigger button means in the controller in accordance with the first mode of embodiment.
Figure 7B:
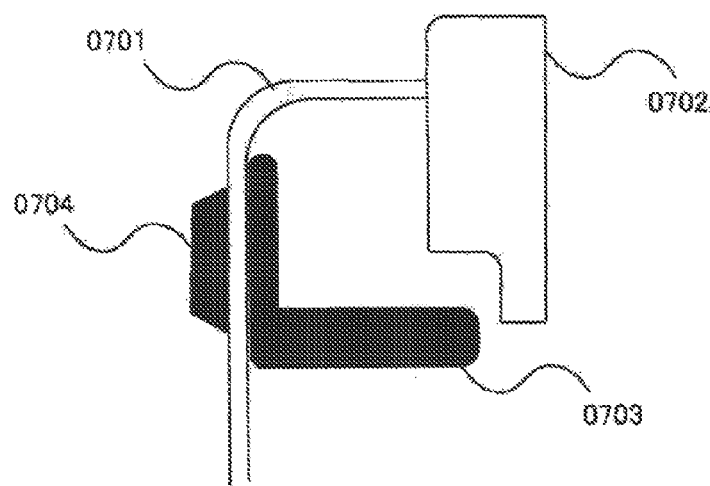

FIGS. 7(*a*)-7(*b*) are perspective views of the present invention, illustrating an example of the surroundings and a sectional view of a trigger button means in the controller in accordance with the first mode of embodiment. FIG. 7 (*a*) is a perspective view of one example of the surroundings of a trigger button means in a controller of the present mode of embodiment, while FIG. 7 (*b*) is a sectional view of the same. A grip 0704 may be provided on a main body 0701 for moving a space adjustment means 0703. The space adjustment means 0703 is directly or indirectly coupled to the grip, and by performing an operation in which the grip is moved, the player can adjust the key stroke.

The first and second modes of embodiment may be combined to form a third mode of embodiment of the present invention. In this embodiment, the adjustment part may be characterized by comprising a base that is provided with recess and a spacer that is provided with protrusions, and the key stroke is adjusted according to whether or not the protrusions are received in the recesses. The controller in this mode of embodiment comprises an operational key, a switch and an adjustment part. The operational key and the switch are similar to that described in the first and second mode of embodiments. The base and the spacer is the same as described in the second mode of embodiment. In this case, instead of the protrusions that were provided in the sliding surface of the base, the recesses are provided in the base. Instead of the recesses which are provided in the facing face of the spacer, the protrusions may be provided on the spacer. With the controller configured in this mode of embodiment, the player can make adjustments so as to achieve an optimal operational feel, according to the player's preferences and game characteristics. Moreover, if a cylindrical opening is used for the recess, it is possible to visually confirm the pairing of the recesses in the base and the protrusions on the spacer.

While a particular form of the invention has been illustrated and described, it will be apparent that various modifications can be made without departing from the spirit and scope of the invention. For example, the trigger button means does not necessarily have to be arranged on the back of the main body. Accordingly, it is not intended that the invention be limited, except as by the appended claims.

What is claimed is:

1. A controller for controlling a game by a player, the controller comprising:
   a main body configured to be held by the player;
   a plurality of operational keys having a cross key, a push button, and a pair of trigger buttons, the plurality of operational keys arranged on the main body, the plurality of operational keys being configured to allow for press-down actuation by the player;
   a pair of analog sticks configured for direction specifying operations, the pair of analog sticks arranged on the main body; and
   a switch arranged in contact with the plurality of operational keys, the switch being actuated by press-down actuation by the player; and
   a plurality of adjustment parts configured for adjusting the key stroke of the plurality of operational keys, the plurality of adjustment parts having a base with a sliding surface and a spacer configured to slide over the sliding surface;
   wherein the plurality of operational keys, the pair of analog sticks, the switch and the plurality of adjustment parts are configured to adjust the controller to provide an optimal tactile sensation to the player.

2. The controller of claim 1 wherein the cross key means is configured to generate operation information in the up, down, left and right cross key directions.

3. The controller of claim 1 wherein the push button means consists of a plurality of buttons to generate operational information.

4. The controller of claim 1 wherein the pair of trigger button means consists of a left trigger button means and a right trigger button means to generate operational information.

5. The controller of claim 1 wherein the base may include at least one protrusion on the sliding surface.

6. The controller of claim 5 wherein the at least one protrusion may be received by at least one recess positioned on a facing surface of the spacer positioned opposite to the sliding surface.

7. The controller of claim 1 wherein the key stroke is adjusted by sliding the spacer with the spacer biased towards the sliding surface.

* * * * *